(12) United States Patent
Schröder et al.

(10) Patent No.: US 6,587,802 B1
(45) Date of Patent: Jul. 1, 2003

(54) CALIBRATION DEVICE FOR A PARALLEL KINEMATIC MANIPULATOR

(75) Inventors: Wilhelm Schröder, Traunstein (DE); Jan Braasch, Altenmarkt (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/397,613

(22) Filed: Sep. 16, 1999

(30) Foreign Application Priority Data

Sep. 17, 1998 (DE) .......................... 198 42 571
May 8, 1999 (DE) .......................... 199 21 325

(51) Int. Cl.⁷ ................................ G01B 5/03
(52) U.S. Cl. ..................... 702/91; 702/33; 702/44; 702/85; 702/94; 702/105; 702/113
(58) Field of Search .................. 702/33, 36, 44, 702/85, 94, 95, 97, 104, 105, 108, 113–115, 150–153, 158, 167, 168, 183, 184, 185, FOR 123, FOR 124, FOR 130, FOR 134, FOR 135, FOR 136, FOR 144, FOR 146, FOR 147, FOR 155–163, FOR 170, FOR 171; 33/502, 548, 503, 556, 557, 549, 551, 552; 73/1.79; 901/14, 15, 16, 17, 18, 41, 44, 50; 700/245, 251

(56) References Cited

U.S. PATENT DOCUMENTS

| | | | | |
|---|---|---|---|---|
| 4,790,718 A | | 12/1988 | Vickers | |
| 5,354,158 A | * | 10/1994 | Sheldon et al. | 409/201 |
| 5,469,531 A | * | 11/1995 | Faure et al. | 395/86 |
| 5,507,596 A | * | 4/1996 | Bostelman et al. | 405/191 |
| 5,656,905 A | * | 8/1997 | Tsai | 318/568.21 |
| 5,752,834 A | * | 5/1998 | Ling | 434/58 |
| 5,797,191 A | * | 8/1998 | Ziegert | 33/503 |
| 5,909,939 A | * | 6/1999 | Fugmann | 33/503 |
| 6,024,526 A | * | 2/2000 | Slocum et al. | 414/226.01 |
| 6,041,500 A | * | 3/2000 | Terpstra | 29/889.21 |
| 6,048,750 A | * | 4/2000 | Hembree | 438/107 |
| 6,086,283 A | * | 7/2000 | Ziegert | 403/57 |
| 6,099,217 A | * | 8/2000 | Wiegand et al. | 409/201 |
| 6,116,844 A | * | 9/2000 | Hayward | 414/680 |
| 6,129,727 A | * | 10/2000 | Austin et al. | 606/56 |
| 6,162,156 A | * | 12/2000 | Fujikawa et al. | 493/165 |
| 6,196,081 B1 | * | 3/2001 | Yau | 74/479.01 |
| 6,211,960 B1 | * | 4/2001 | Hembree | 356/400 |
| 6,223,604 B1 | * | 5/2001 | Fronczak et al. | 73/856 |
| 6,239,590 B1 | * | 5/2001 | Krivy et al. | 324/158.1 |
| 6,272,766 B1 | * | 8/2001 | Tondorf et al. | 33/809 |

FOREIGN PATENT DOCUMENTS

WO    WO96/30170    10/1996

OTHER PUBLICATIONS

M. P. Oliviers et al., "Global Kinematic Calibration Of A Stewart Platform", Proceedings of the ASME Dynamic Systems and Control Division, DSC vol. 57–1, 1995, pp. 129–136.

(List continued on next page.)

Primary Examiner—Marc S. Hoff
Assistant Examiner—Carol S. Tsai
(74) Attorney, Agent, or Firm—Kenyon & Kenyon (57) ABSTRACT

A calibration device for a parallel kinematic manipulator having a base unit and a manipulator platform movable with respect thereto, the manipulator platform being connected to the base unit via a plurality of joints and a plurality of variable length actuators. The calibration device for measuring n deviations in order to determine m unknowns includes a test workpiece that is mountable in a definite spatial position with respect to the base unit and has I=m/n measuring mandrels. The calibration device also has a probing unit attached to the manipulator platform, and including n probing subsystems, the probing subsystems each including a distance measuring device for measuring the spatial position and spatial orientation of the measuring mandrels on the test workpiece.

10 Claims, 6 Drawing Sheets

OTHER PUBLICATIONS

C. Innocenti, "Algorithms For Kinematic Calibration of Fully–Parallel Manipulators", Computational Kinematics (Edts: Merlet, Ravani) Kluwer Academic Publishers 1995, pp. 241–250.

G. Fried et al., A 3D Sensor For Parallel Robot Calibration, A Parameter Perturbation Analysis, Recent Advances In Robot Kinematics (Edts: Lenarcic, Parenti–Castelli), Kluwer Academic Publishers 1996, pp. 451–460.

A. J. Patel et al, "Volumetric Error Analysis Of A Stewart Platform Based Machine Tool", Annals of the CIRP, vol. 46/1/1997, pp. 287–290.

L. Rademacher, "Wie genau arbeiten Automaten In Roboter", Feb. 1992, S 50–52 (English Abstract Provided).

* cited by examiner

Deviation of TCP over the work space with Z=800 mm

FIG. 7b

Deviation of TCP over the work space after the first iteration step

CALIBRATION DEVICE FOR A PARALLEL KINEMATIC MANIPULATOR

The present invention relates to a device for calibrating a parallel kinematic manipulator, and more specifically to a device suitable for calibrating a machine tool designed according to the hexapod principle.

DESCRIPTION OF RELATED ART

Alternative machine tool kinematics are being increasingly used in designing machine tools, such as in machine tools designed according to the hexapod principle or as Stewart platforms. In such machine tools, or more generally in parallel kinematic manipulators, the relative motion between workpiece and tool is effected by the simultaneous motion of actuators normally moving in six translational and/or rotational axes. The respective actuators normally consist of variable-length telescopic arms.

In order to ensure the required positional accuracy, the geometry of the parallel kinematic manipulator being used must be known with extreme precision. In general, the actual geometry of such a manipulator is not identical to the designed ideal geometry due to manufacturing and assembly tolerances. These deviations in turn result in accuracy deviations when the machine is used in machining a workpiece. Therefore, such a parallel kinematic manipulator must be calibrated prior to use to determine its actual geometry. A correction can then be used when machining the workpiece to account for the deviation in manipulator geometry.

In particular, in the case of a typical design consisting of one base unit connected to a manipulator platform via a plurality—for example, six—parallel actuators, the exact coordinates of the joints between the actuators and the base unit/manipulator platform must be known. Only when these coordinates are known can the tool and thus the "tool center point," hereinafter referred to as TCP, be definitively positioned on the manipulator platform with the required accuracy. The TCP is the point of the tool that interacts with the workpiece.

To calibrate such kinematic manipulators, a plurality of calibration algorithms have been proposed. In all these calibration methods, a certain number of TCP points are measured in the manipulator's work space, from which the actual joint coordinates are determined. The joint coordinates are in turn taken into account by the controller in positioning the tool. Reference is made to the following publications, that describe examples of he calibration procedure.

i) Global Kinematic Calibration of a Stewart Platform, Oliviers M. P., Mayer J. R. R., Proceedings of the ASME Dynamic Systems and Control Division, DSC Vol. 57-1; 1995, pp. 129–136;

ii) Algorithms for Kinematic Calibration of Fully-Parallel Manipulators, Innocenti C., Computational Kinematics (Edts: Merlet, Ravani), Kluwer Academic Publishers 1995, pp. 241–250;

iii) A 3D Sensor for Parallel Robot Calibration. A Parameter Perturbation Analysis, Fried G. et al., Recent Advances in Robot Kinematics (Edts: Lenarcic, Parenti-Castelli), Kluwer Academic Publishers 1996, pp. 451–460;

iv) Volumetric Error Analysis of a Stewart Platform-based Machine Tool, Patel A., Ehmann K., Annals of the CIRP, Vol. 46/1/1997.

In these publications, calibration algorithms for parallel kinematic manipulators are presented and discussed. However, no practical calibration device for those calibration algorithms, offering sufficient accuracy, is provided by any of these publications.

Accordingly, there is a need for an improved device for calibrating parallel kinematic manipulators that obviates some of the drawbacks of currently known devices.

SUMMARY OF THE INVENTION

The present invention is directed to a device that allows a parallel kinematic manipulator to be calibrated with a high degree of accuracy, and that substantially obviates one or more of the problems due to limitations and disadvantages of the related art. Additional features and advantages of the invention will be set forth in the description which follows, and in part will be apparent from the description, or may be learned by practice of the invention. Other advantages of the invention will be realized and obtained by the apparatus and method particularly pointed out in the written description and claims hereof, as well as the appended drawings.

According to one embodiment, the invention is a calibration device for measuring n deviations and determining m unknown spatial coordinates of a parallel kinematic manipulator having a base unit and a manipulator platform movable with respect to the base unit, the base unit being connected to the manipulator platform via a plurality of joints and a plurality of variable-length actuators, and having a workholding fixture for a tool. The calibration device includes a test workpiece mountable in a defined spatial relation to the base unit, measuring mandrels numbering l=m/n, arranged on the test workpiece in a known spatial position and a known spatial orientation with respect to a reference spatial position and a reference spatial orientation, and a probing unit mountable on the workholding fixture of the manipulator platform. The calibration device also includes n probing subsystems, each of the n probing subsystems including a distance measuring device for relative measurements, and being oriented with respect to each other of the n probing subsystems such that the probing unit is adapted for measuring the known spatial position and known spatial orientation of the measuring mandrels on the test workpiece.

In another embodiment, the invention is a method of calibrating a parallel kinematic manipulator that includes selecting a test workpiece comprising a plurality of measuring mandrels arranged in a known spatial position and known spatial orientation, and a reference measuring mandrel defining a reference spatial position and orientation, selecting a probing unit having a plurality of probing subsystems for measuring relative distances, the probing unit being attached to a manipulator platform movable relative to a base unit of the kinematic manipulator, and positioning the test workpiece a defined spatial relation to the base unit. The method further includes determining measured spatial position and measured spatial orientation of the plurality of measuring mandrels and the reference measuring mandrel with the probing unit, computing calibration values for the kinematic manipulator from the known spatial position and orientation and from the measured spatial position and orientation of the plurality of measuring mandrels and the reference measuring mandrel.

The calibration device according to the present invention allows a parallel kinematic manipulator to be calibrated in a simple manner. The device according to the present invention can also be used in combination with a plurality of manipulator geometries, and is therefore extremely adaptable.

Different calibration algorithms from the one described in detail can also be used in conjunction with the device according to the present invention, since the device allows several translational and/or rotational deviations to be simultaneously measured in a single contact probing operation.

The device according to the present invention allows the actual TCPs to be determined or measured with a high degree of accuracy. Thus, a suitably designed parallel kinematic manipulator can also ultimately be used to position a machine tool.

The device according to the present invention has the further advantage that it is essentially made up of simple standard components, with the result that manufacturing costs are low. In particular, the test workpiece of the calibration device does not have to be designed with high geometric precision. It is only necessary that the exact geometry of the test workpiece be determined prior to use, for example, by measuring it with a coordinate measuring device.

Further advantages and details of the calibration device according to the present invention, and a suitable calibration algorithm for the device are provided in the description of an embodiment that follows, with reference to the attached drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute part of the specification, illustrate an embodiment of the invention and together with the description serve to explain the present invention. In the drawings.

DETAILED DESCRIPTION OF THE EMBODIMENTS

Figure 1:
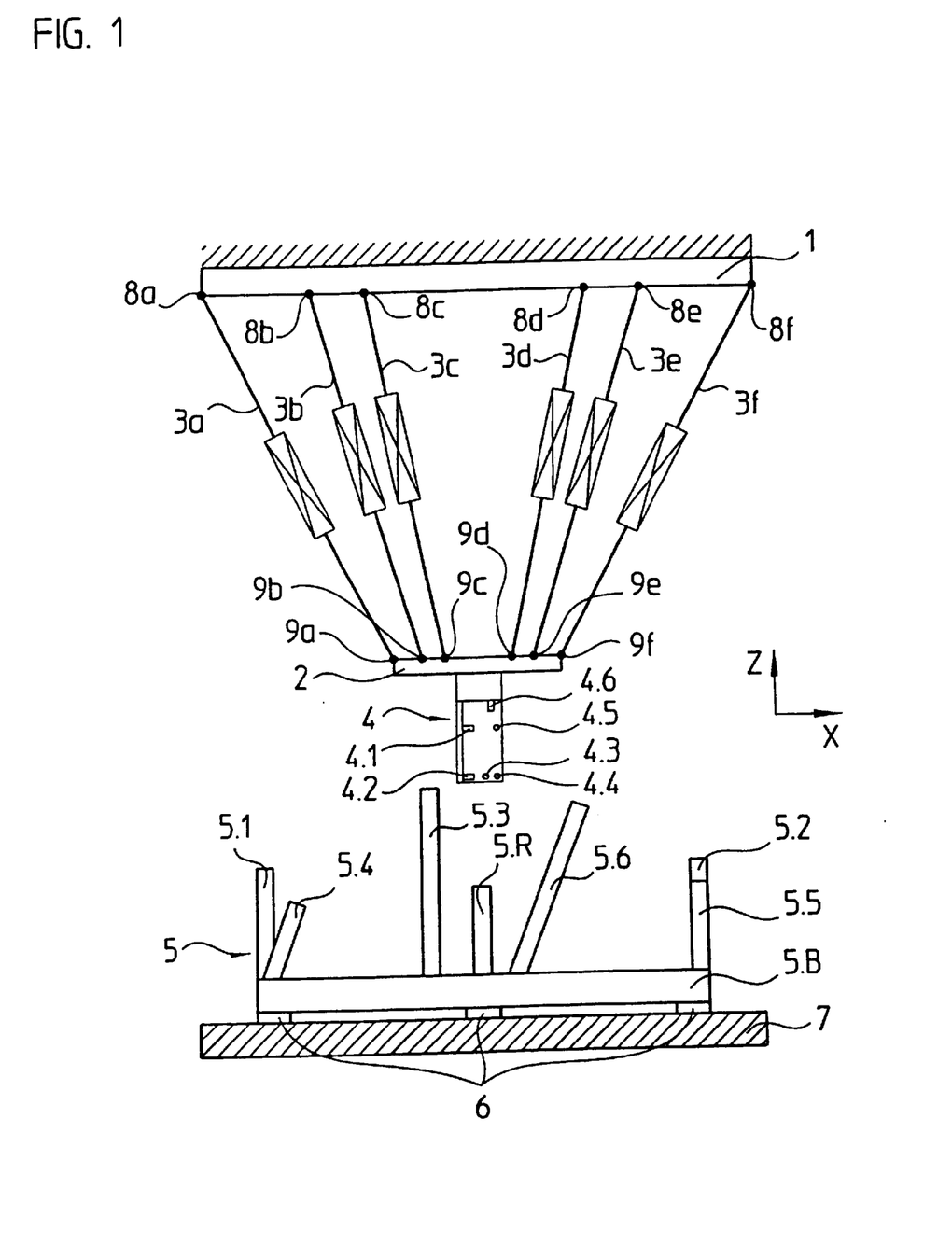
FIG. 1 is a schematic side view showing an overall view of a parallel kinematic manipulator in combination with one embodiment of the calibration device according to the present invention.

One embodiment of the calibration device according to the present invention, used in conjunction with a typical parallel kinematic manipulator, is schematically illustrated in FIG. 1.

In this embodiment, the parallel kinematic manipulator includes a base unit 1 and a manipulator platform 2 connected thereto via six variable length telescopic arms and actuators 3a–3f. Six joints 8a–8f, and 9a–9f are provided respectively between actuators 3a–3f and manipulator platform 2, and between actuators 3a–3f and base unit 1. Thus the manipulator geometry illustrated in FIG. 1 includes a total of twelve separate joints 8a–8f, 9a–9f.

Manipulator arm 2 furthermore has a workholding fixture (not shown in this figure), which for example, may be used to hold a tool, when the manipulator is used as a machine tool. The manipulator geometry shown can also be used in other manners, for example as a coordinate measuring device. In that case, the workholding fixture on manipulator platform 2 would be used to accommodate a suitable probe, or other measuring device.

The parallel kinematic manipulator is of conventional construction, and manipulator geometries that are different from the one shown in the drawings can also be calibrated with the calibration device according to the present invention.

Figures 2A, 2B, 2C:
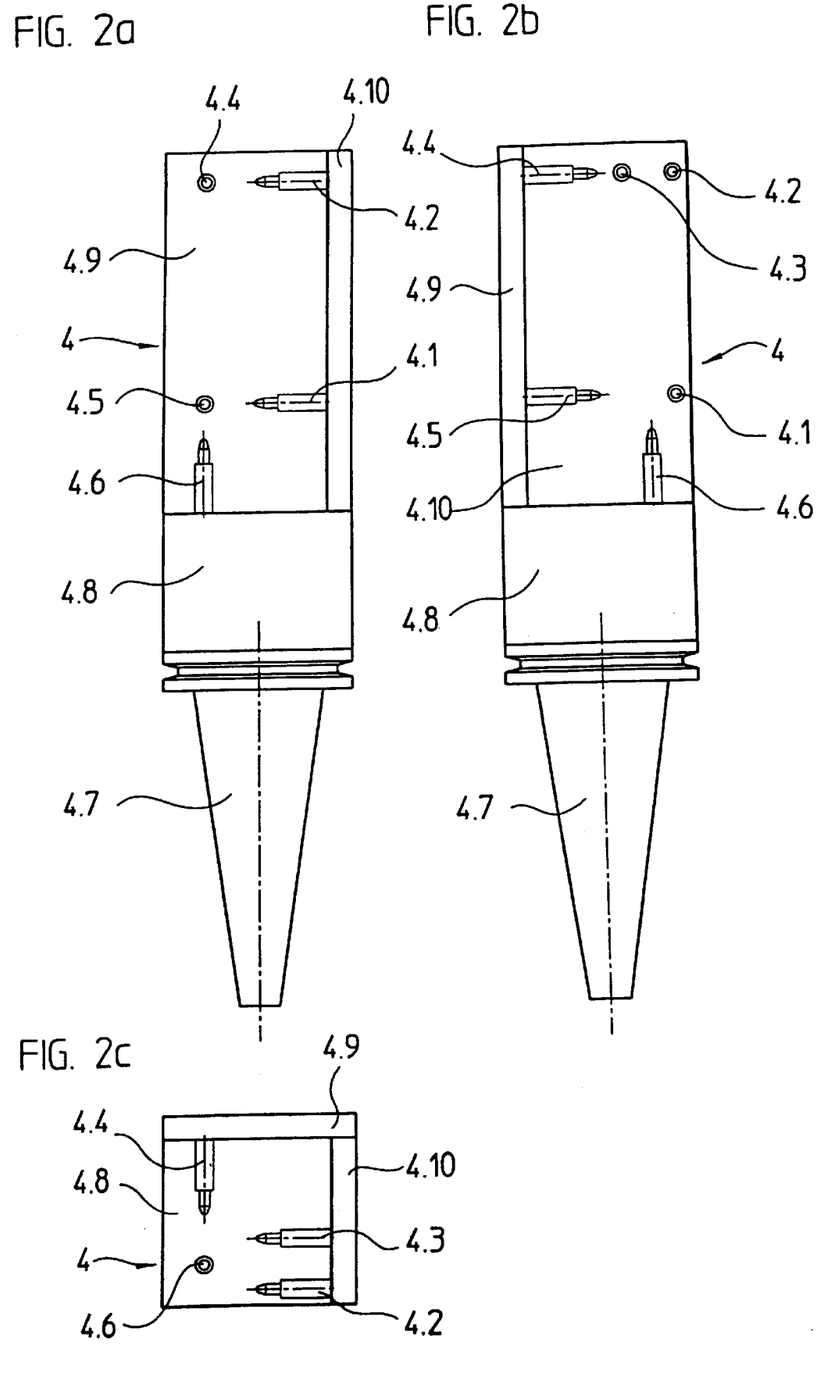
FIGS. 2a–2c respectively show a front, side elevation, and top plan different view of the probing unit of the calibration device shown in FIG. 1.

The calibration device according to the present invention, which is explained in more detail below with reference to the drawings, has basically a two-part structure. The first part of the calibration device has a probing unit 4, which is arranged in the aforementioned workholding fixture of manipulator platform 2 via a suitable workholding fixture counterpiece. The workholding fixture counterpiece 4.7 and the workholding fixture are shown in FIGS. 2a, 2b. A plurality of probing subsystems 4.1–4.6 are in turn provided in a preselected geometrical arrangement on probing unit 4. Each of probing subsystems 4.1–4.6 includes a distance measuring device for relative measurements, which in the present exemplary embodiment is a measuring probe with a measuring screw that can be displaced longitudinally. Reference is made to FIGS. 2a–2c for a more detailed description of probing unit 4.

The second part of the calibration device according to the present invention includes a test workpiece 5. Test workpiece 5 is mountable in a defined orientation with respect to base unit 1 via a schematically illustrated three-point support 6. For example, an arrangement can be provided on a suitable bench 7, that normally is used to mount the workpiece to be machined. Essentially, test workpiece 5 is made up of a plurality of test pieces in the form of measuring mandrels 5.R, 5.1–5.6, which are in turn arranged on base 5.B. The design of the measuring mandrels in the embodiment illustrated can be varied, and should by no means be understood as limiting. Alternative geometries of the measuring mandrels/test work pieces can therefore also be used, within the framework of the present invention to assemble test workpiece 5. In the embodiment of the calibration device shown, a total of seven measuring mandrels 5.R, 5.1–5.6 are provided on one face of test workpiece 5. One measuring mandrel 5.R is used here as a reference measuring mandrel, while the other six measuring mandrels 5.1–5.6 are arranged in a defined spatial position and in a defined spatial orientation with reference to measuring mandrel 5.R. The exact spatial arrangement of the different measuring mandrels 5.R, 5.1–5.6 of this embodiment is described with reference to FIGS. 3a–3c.

The spaces between measuring mandrels 5.R, 5.1–5.6, arranged on the sides of test workpiece 5, have dimensions that approximately correspond to the distances through which manipulator platform 2 is required to move in the work space. Therefore, the dimensions of test workpiece 5 approximately correspond to the dimensions of the operating work space volume of the parallel kinematic manipulator machine tool. This allows a desired calibration accuracy to be achieved.

A material that is as thermally stable as possible, i.e. has a low heat expansion coefficient, is preferably selected for manufacturing test workpiece 5. For example, the complete test workpiece can be made of invar. Alternatively, base 5.B can be manufactured of carbon fiber reinforced plastic and measuring mandrels 5.R, 5.1–5.6 can be made of invar, zerodur, or other materials having similar thermal expansion coefficient.

During the calibration procedure, after reference measuring mandrel 5.R has been probed, the other measuring mandrels 5.1–5.6 are probed consecutively with the help of probing unit 4. The relative spatial positions, as well as the relative spatial orientations of probed measuring mandrels 5.1–5.6 are determined with respect to reference measuring mandrel 5.R. The deviation of the actual position and orientation of a measuring mandrel 5.1–5.6 with respect to its nominalposition and orientation is determined by carrying out consecutive probing contacts. The calibration algorithm then computes and delivers the deviations from nominalpositions, required for calibration of the spatial coordinates of the twelve joints 8a–8f, 9a–9f, starting from the deviations and the evaluation of the measured values thus obtained. A suitable exemplary calibration algorithm is described here in the APPENDIX to this specification. However, other algorithm performing the same computations can also be used.

Several detailed views of probing unit 4 of the calibration device according to the present invention are shown in FIGS. 2a–2c. Workholding fixture counterpiece 4.7, through which probing unit 4 is arranged in the workholding fixture of the manipulator platform, can be clearly seen in both FIGS. 2a and 2b. In the embodiment shown, the required rigid and centered coupling of probing unit 4 to the manipulator platform 2 is implemented with the help of a clamping system, which provides a conical seat on the sides of probing unit 4 used as a workholding fixture counterpiece 4.7. Other known tool clamping systems can also be used at this point as an alternative, for example, HSK (hollow conical shaft) or SK (rigid conical) systems can be used.

In addition to workholding fixture counterpiece 4.7, probing unit 4 also includes a base 4.8 connected thereto having a square cross section, on which elongated side pieces 4.9, 4.10 are arranged at right angles to one another. Thus, side pieces 4.9, 4.10 and the adjacent boundary surfaces of the base form a Cartesian coordinate system with three orthogonal axes.

In dimensioning probing unit 4, it is advantageous to make sure that collisions between probing unit 4 on the one hand, and test workpiece 5 and the different measuring mandrels 5.R, 5.1–5.6 on the other hand, are prevented as much as possible during calibration.

The aforementioned six probing subsystems 4.1–4.6 are arranged perpendicularly to one another on base 4.8 and on side parts 4.9, 4.10. Probing subsystems 4.1–4.6 in turn include one distance measuring device for relative measurements, and are designed, for example, as incremental measuring probes with a measuring screw that can be pneumatically displaced in the longitudinal direction. For example, the probes could be similar to those sold by the Applicant under the model designation METRO MT12P.

The number of required probing subsystems 4.1–4.6 disposed on the sides of the probing unit depends basically on the number of deviations on the sides of the manipulator geometry to be ultimately determined. Therefore, in the case of three translational position deviations and three rotational orientation deviations of the different joints of the parallel kinematic manipulator to be determined by measurement, a total of six probing subsystems 4.1–4.6 is required.

In principle, it may be necessary to measure only five possible deviations on the sides of the manipulator used, for example when certain rotational degrees of freedom are not enabled. For example, the kinematics of the manipulator may not allow rotation of the main spindle about its axis of rotation, which in turn would reduce the number of required probing subsystems to five. In the above example of probing unit 4, probing subsystem 4.3 could then be omitted.

The spatial arrangement of the six probing subsystems 4.1–4.6 in probing unit 4 depends on the motion deviations to be determined for the tool center point TCP in the manipulator coordinate system. This is normally a Cartesian coordinate system. This results in a first requirement for the arrangement of probing subsystems 4.1–4.6 in probing unit 4, that the respective measuring directions of at least three of the probing subsystems must be selected to be linearly independent of one another. In the embodiment illustrated in FIGS. 2a–2c, these three subsystems are, for example, probing subsystems 4.2, 4.4, and 4.6. Thus, in combination with the other probing subsystems, these three probing subsystems 4.2, 4.4, 4.6 allow determination of a translational deviation of an actual position from a nominalposition. The respective longitudinal axes of probing subsystems 4.1–4.6 are considered the measuring directions along which relative distance measurements are possible.

A second requirement for the number and arrangement of the probing subsystems exists. This is that it must be possible to determine rotational deviations from one difference measurement via three additional probing subsystems. In the embodiment described, these are the three probing subsystems 4.1, 4.3, 4.5.

In addition to these requirements for the arrangement of the individual probing subsystems 4.1–4.6, the relative arrangement within probing unit 4 must be designed as a function of the geometry of the measuring mandrels on the test workpiece. Thus, in this context, the cross section of the measuring mandrels, and in particular the respective geometric dimensions of the individual measuring mandrels must be taken into account.

If other kinematic manipulators need to be calibrated, a different number of probing subsystems may be required, and a different spatial arrangement of these subsystems within the probing unit of the calibration device according to the present invention may result.

The configuration of test workpiece 5 with the different measuring mandrels 5.R, 5.1–5.6 is closely related to the number and arrangement of probing subsystems 4.1–4.6 in probing unit 4. This will be discussed in the following in connection with the explanations to FIGS. 3a–3c. FIGS. 2a and 2b show different side views of test workpiece 5, including measuring mandrels 5.R, 5.1–5.6. FIG. 2c is a top view of test workpiece 5.

Figure 3A:
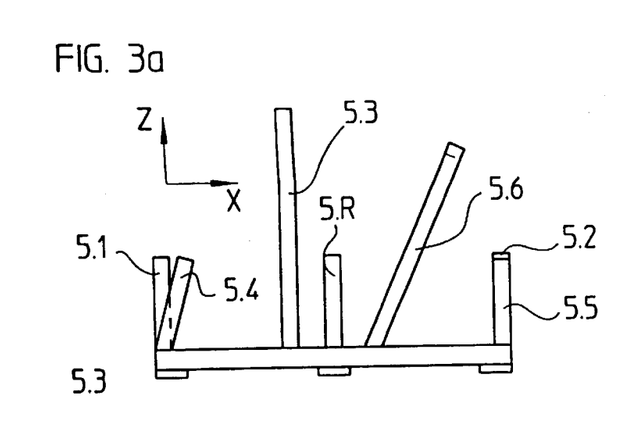
FIGS. 3a–3c respectively show a front, side elevation, and top plan view of the test workpiece of the calibration device shown in FIG. 1.
Figure 3B:
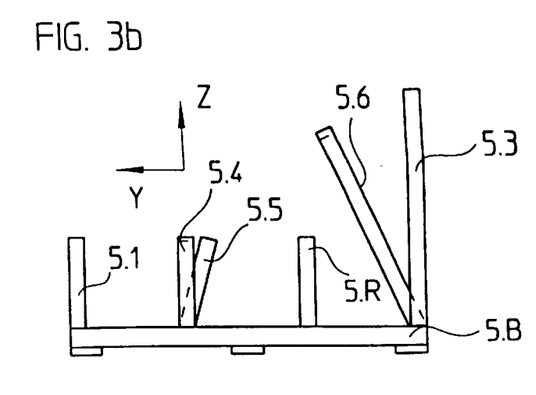
Figure 3C:
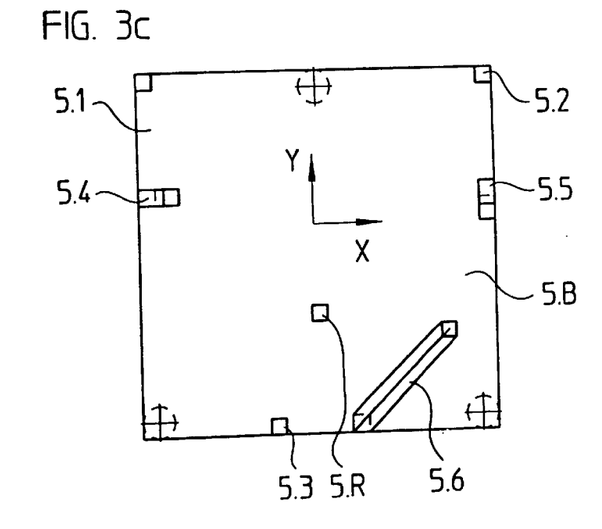

As mentioned above, test workpiece 5 according to the illustrated embodiment has a preferably flat base 5.B on which are arranged, for example, a total of seven rectangular measuring mandrels 5.R, 5.1–5.6 having a square cross-section. Base 5.B can be arranged via the three-point support 6, shown below the base 5, in a definite spatial relationship with respect to the work space of the manipulator. For example, the entire assembly may be mounted on a suitable bench.

With regard to the accuracy required in manufacturing the test workpiece, the only requirement is that the boundary surfaces of measuring mandrels 5.R, 5.1–5.6 should be made as flat as possible. In addition, the perpendicularity of the adjacent boundary surfaces of measuring mandrels 5.R, 5.1–5.6 must be ensured if, as in the case of the above-described probing unit, a Cartesian coordinate system is used for the probing subsystems. On the other hand, no strict manufacturing requirements exist with respect to the exact position or orientation of the individual measuring mandrels 5.R, 5.1–5.6 mounted on base 5.B. The exact position and orientation of the measuring mandrels is rather determined by a reference measurement using a coordinate measuring device prior to calibrating the manipulator, and the respective measured values are supplied to the calibration algorithm.

The selected calibration algorithm, one possible example of which is explained in detail in the APPENDIX that follows, initially requires a reference position and a reference orientation against which the subsequent given test positions and test orientations are measured. For this purpose, in the embodiment of the calibration device shown, a reference measuring mandrel 5.R is provided on the side of test workpiece 5. Reference measuring mandrel 5.R is probed by probing unit 4 during calibration as a first measuring step, and is used as a "zero point" against which the other six measuring mandrels 5.1–5.6 are then probed. The deviations of the actual manipulator geometries from the ideal geometries can then be determined with the help of the calibration algorithm via the subsequent probing of the other measuring mandrels 5.1–5.6. Such "zero point" on the side of test workpiece 5 does not necessarily need to be defined by another measuring mandrel 5.R. As an alternative, a "zero point" that is fixed with respect to the machine and is detected via suitable referencing signals can also be selected as the "zero point" for the respective measurements, resulting in a definite spatial reference position and a spatial reference orientation.

To calibrate the kinematics manipulator shown, the arrangement of the different measuring mandrels is subject to certain rules, which are basically defined by the selected calibration algorithm.

For example, no more than three out of the six measuring mandrels may have the same spatial orientation. In the embodiment shown, these are measuring mandrels 5.1, 5.2 and 5.3. Furthermore, the three measuring mandrels 5.1, 5.2 and 5.3 having the same orientation must have positions that are linearly independent of one another. That means that the positions defined by the three measuring mandrels may not lie in the same plane with respect to the reference position defined by the reference measuring mandrel. The three other measuring mandrels 5.4, 5.5 and 5.6 must all have different spatial orientations with respect to one another. An arrangement of measuring mandrels 5.1–5.6 on base 5.B selected according to these rules ensures that three translational and three rotational deviations can be determined simultaneously, by performing a single probing operation with probing unit 4, as described above.

The actual joint coordinates and orientations of the parallel kinematic manipulator geometry can be determined from the spatial arrangement of measuring mandrels 5.R, 5.1–5.6 in conjunction with the calibration algorithm outlined below. During the actual calibration procedure, as performed for the embodiment described, reference measuring mandrel 5.R is first probed at least once, and then each individual measuring mandrel 5.1–5.6 is probed and its relative deviation from the nominalposition and nominalorientation is measured. As mentioned above, the nominal-position and nominalorientation for the different measuring mandrels is determined prior to the actual calibration procedure by measuring the test workpiece using a coordinate measuring device. The reference measuring mandrel 5.R is preferably probed prior to probing each measuring mandrel 5.1–5.6, and thus a "zero point" is defined for the subsequent calibration measurement.

In the above embodiment, the geometry of the manipulator device defines n=6 deviations that have to be determined, which include three translational and three rotational deviations. Therefore, the m=36 spatial coordinates sought of the 12 manipulator joints can be determined. This in turn requires six probing subsystems disposed on the sides of the calibration device, and I=m/n=6 measuring mandrels. An additional measuring mandrel serves as a reference measuring mandrel, against which the other six measuring mandrels are measured in the calibration.

If, in addition, the absolute lengths of the six actuators are also unknown, six more unknowns are obtained, which are to be taken into account in the algorithm. Thus a total of m=42 unknowns result. The solution to this problem requires six probing subsystems disposed on the sides of the calibration device, and I=m/n=7 measuring mandrels. An additional measuring mandrel serves as a reference measuring mandrel against which the other seven measuring mandrels are measured in the calibration.

In the general case, for the measurement of "n" deviations and determination of "m" unknowns in the form of the spatial joint coordinates on the sides of the respective parallel kinematic manipulator geometry, I=m/n measuring mandrels must be provided on the test workpiece plus one reference measuring mandrel, as in the embodiment described above. As described above, the reference position and the reference orientation do not necessarily need to be given by a reference measuring mandrel. The probing unit of the calibration device in turn includes n probing subsystems. Thus the calibration device according to the present invention can be flexibly adapted to the most diverse manipulator characteristics.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

APPENDIX

Calibration Algorithm

1 Procedure

The calibration algorithm is derived below using the example of a conventional Stewart platform (FIG. 4) in which the platform is manipulated using telescopic arms (actuators). This method can be transferred without difficulty to other forms of parallel kinematic manipulators such as shear kinematic manipulators. The method is based on the following assumptions:

the geometric deviations of the parallel kinematic manipulator are small compared to the main dimensions of the machine (linear assumption);

the variations in the length of the actuators are measured with high resolution and ideally directly;

the drives have no play;

the elastic flexibility of the structure and of the drive shafts is negligible;

no heat effects exist.

The geometry of the hexapod is conveniently described using vectors. For this purpose, an inertial coordinate system I is assumed, which is identical to the machine coordinate system. Manipulator platform P that is to be manipulated has six degrees of freedom, as defined in the context of rigid body mechanics. Therefore, six actuators having linearly independent lines of action are needed for a statically determined manipulation of the platform. The geometry of the platform can be described in a particularly simple manner in a coordinate system P of the platform, whose origin is in the theoretical point of rotation of the platform.

Figure 4:
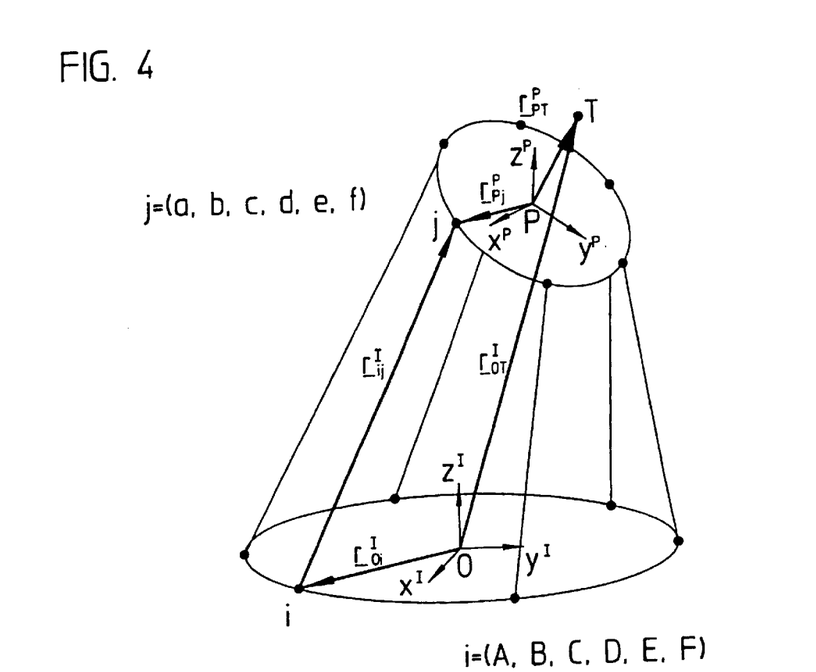
FIG. 4 is a diagram showing a vectorial representation of an ideal Stewart platform to describe a suitable calibration algorithm.

Orthogonal transformation $\underline{\underline{T}}$, which includes the three rotational parameters required for unambiguously describing the platform orientation, exists between coordinate system P and inertial system I. Thus, according to FIG. 4, the geometry of the hexapod has the vectorial form:

$$r^I_{OT} = r^I_{Oi} + r^I_{ij} + \underline{\underline{T}} \cdot (r^P_{PT} - r^P_{Pj}) \quad \text{(Eq. 1.1)}$$

where $r^I_{OT}$ vector of the TCP in inertial system I $r^I_{Oi}$ vectors of base joint points i in inertial system I $r^I_{ij}$ actuator vectors $\underline{\underline{T}}$ orthogonal rotation matrix, P→I transformation $r^P_{Pj}$ vectors of platform joint points j in coordinate system P $r^P_{PT}$ vector of the TCP in coordinate system P.

Assuming that the true geometry of the hexapod is subject to errors, the problem to be solved is that the actual position and orientation of the platform does not coincide with the theoretical position and orientation. The absolute position and orientation of the platform is therefore not accurately known for any point of the work space. Therefore, a calibration method should be capable of determining the absolute joint coordinates from relative measurements. For this purpose, deviations between two relative positions are measured, with one position of the work space being selected as the reference position. In this case, the reference point is position T described by eq. (1.1).

Figure 5:
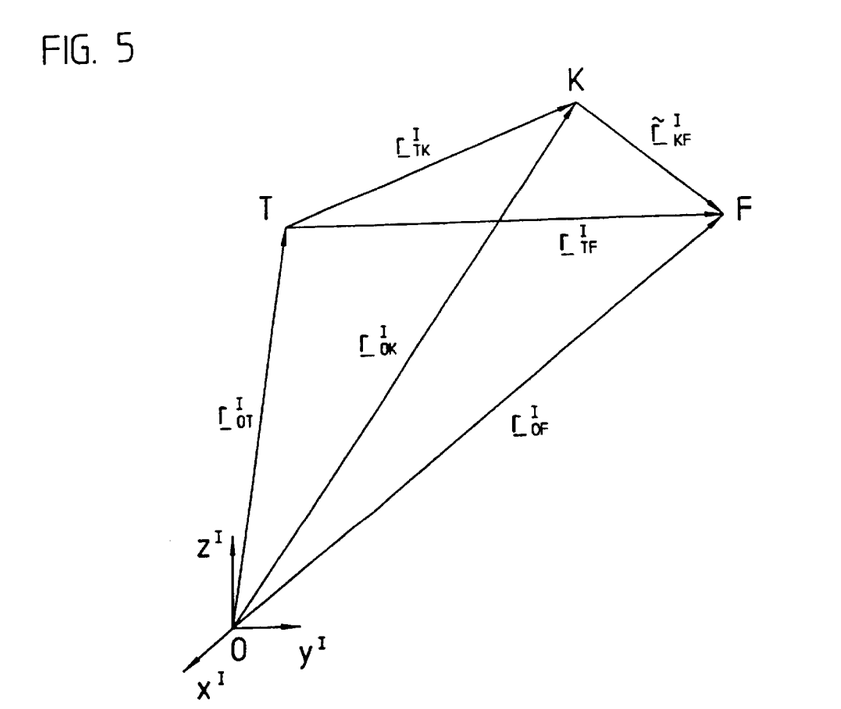
FIG. 5 is a diagram showing a vectorial representation of the TCP motion to define the deviations of the TCP as a result of incorrect joint coordinates.

If a second position K is defined for the TCP, it can also be described theoretically, i.e., assuming ideal geometry, in a similar manner, as shown in FIGS. 4 and 5.

$$r^I_{OK} = r^I_{Oi} + {}^K r^I_{ij} + \underline{\underline{T}}_K \cdot (r^P_{PT} - r^P_{Pj}) \quad \text{(Eq. 1.2)}$$

where $r^I_{OK}$ vector of the TCP at point K ${}^K r^I_{ij}$ actuator vectors for TCP=K $\underline{\underline{T}}_K$ absolute orientation for TCP=K Due to the geometric uncertainties in the joints, the TCP in reality will go to a position F (FIG. 5). In order to mathematically define this position, all quantities that vary due to the geometric errors are expediently treated as erroneous. Since these geometric errors can be considered "small" compared to the overall dimensions of the machine, they are considered linear. We obtain $$r^I_{OF} = r^I_{Oi} + \tilde{r}^I_{Oi} + {}^F r^I_{ij} + (\underline{\underline{T}}_K + \underline{\underline{\tilde{T}}}) \cdot (r^P_{PT} - r^P_{Pj} - \tilde{r}^P_{Pj}) \quad \text{(Eq. 1.3)}$$

where $r^I_{OF}$ vector of the TCP at point F $\tilde{r}^I_{Oi}$ coordinate error of base joint i in coordinate system I ${}^F r^I_{ij}$ actuator vectors for TCP=F $\tilde{r}^P_{Pj}$ coordinate errors of platform joint j in coordinate system P $$\text{and } \underline{\underline{\tilde{T}}} = \begin{bmatrix} 0 & -\gamma_z & \beta_y \\ \gamma_z & 0 & -\alpha_x \\ -\beta_y & \alpha_x & 0 \end{bmatrix}.$$

Equations (1.2) and (1.3) describe absolute positions, which are difficult to determine by measurement. The theoretical relative motion of the TCP (FIG. 5) between reference point T and nominal position K is obtained from the difference of equations (1.1) and (1.2).

$$r^I_{TK} = {}^{TK} r^I_{ij} + \underline{\underline{T}}_{TK} \cdot (r^P_{PT} - r^P_{Pj}) \quad \text{(Eq. 1.4)}$$

where $r^I_{TK}$ relative motion of the TCP between T and K ${}^{TK} r^I_{ij}$ difference of the actuator vectors between points T and K $\underline{\underline{T}}_{TK}$ change in orientation of the platform between points T and K From the difference of equations (1.1) and (1.3), the actual relative motion of the TCP (FIG. 5) between points T and F is obtained.

$$r^I_{TK} + \tilde{r}^I_{KF} = \tilde{r}^I_{Oi} + {}^{TF} r^I_{ij} + (\underline{\underline{T}}_{TK} + \underline{\underline{\tilde{T}}}) \cdot (r^P_{PT} - r^P_{Pj}) - (\underline{\underline{T}}_K + \underline{\underline{\tilde{T}}}) \cdot \tilde{r}^P_{Pj} \quad \text{(Eq. 1.5)}$$

where $\tilde{r}^I_{KF}$ translational deviations at the TCP ${}^{TF} r^I_{ij}$ difference of the actuator vectors between points T and F The difference between equations (1.4) and (1.5) describes the deviation of the actual position from the theoretical position $$\tilde{r}^I_{KF}$$

(FIG. 5). In order to reach the theoretical position K with the TCP from point T, the required length changes of the actuators are calculated by the machine control using Eq. (1.5). Since these variations in length of the actuators $\|r^1_{ij}\|$ are measured, according to the assumptions, with high resolution and ideally directly for the sake of accuracy, from Eqs. (1.5) and (1.6) we obtain:

$$\|{}^{TK} r^I_{ij}\|^2 = \|{}^{TF} r^I_{ij}\|^2 \cdot (i = A, \ldots, F); (j = a, \ldots, f) \quad \text{(Eq. 1.6)}$$

Deviations of the TCP can therefore be attributed exclusively to erroneous joint coordinates. Taking the difference of the absolute values defined in eq. (1.6) from eqs. (1.4) and (1.5), neglecting the higher-order terms, after some calculation results in a linear system of equations for the unknown joint coordinates:

$$^{TK}\underline{r}^I_{ij} \cdot [\underline{\hat{r}}^I_{Oi} - \underline{T}_K \cdot \underline{r}^P_{Pj}] = {}^{TK}\underline{r}^I_{ij} \cdot [\underline{\hat{r}}^I_{KF} - \underline{\hat{T}} \cdot (\underline{r}^P_{PT} - \underline{r}^P_{Pj})] \qquad \text{(Eq. 1.7)}$$

Thus, for the six actuators of the hexapod, six equations are obtained for the 36 unknown joint coordinates. If the position and orientation deviations of the TCP are measured in six different positions K (K=1, ..., 6), the required 36 linear equations are obtained for the 36 unknown joint coordinates.

If, in addition to the unknown joint coordinates, the absolute lengths of the actuators are also unknown, we will have a total of 42 unknowns with the additional six unknowns. If $\delta_i$ is the absolute value by which the ith actuator deviates from its theoretical absolute length, Eq. (1.7) must be supplemented as follows:

$$^{TK}\underline{r}^I_{ij} \cdot [\underline{\hat{r}}^I_{Oi} - \underline{T}_K \cdot \underline{\hat{r}}^P_{Pj}] + \|^{TK}\underline{r}^I_{ij}\| \cdot \delta_i = {}^{TK}\underline{r}^I_{ij} \cdot [\underline{\hat{r}}^I_{KF} - \underline{\hat{T}} \cdot (\underline{r}^P_{PT} - \underline{r}^P_{Pj})] \qquad \text{(Eq. 1.7')}$$

where $\delta_i$ is the length deviation of the ith actuator from its theoretical length.

Six equations are again obtained for the 42 unknowns. Thus, the position and orientation deviations of the TCP must be measured in seven different positions K (K=1, ..., 7) in order to obtain the required 42 equations for the 42 unknowns.

By linearizing the equations, however, only an approximate value for the correction of the joint coordinates is determined with Eq. (1.7). Therefore a recursive or iterative method must be used. The measurement of the position deviations $$\underline{\hat{r}}^I_{KF} \text{ and } \underline{\hat{T}}$$

with the subsequent calculation of the corrected joint coordinates is therefore repeated until the required accuracy of the TCP is obtained. The advantage of this method is the linear approach for determining the geometric deviations of the joint point coordinates. Thus the numerical difficulties that arise in solving "poorly conditioned" non-linear systems of equations are circumvented.

One important question for the solution of linearized equations is the conditioning of system matrix $\underline{\underline{A}}$ of the linear system of equations to be solved. For a solution to exist, system matrix $\underline{\underline{A}}$ should not be singular, i.e., $\text{Det}[\underline{\underline{A}}] \neq 0$. From Eq. (1.7) it follows that the system matrix of the linear system of equations is formed by vectors $^{TK}\underline{r}^1_{ij}$. Vectors $^{TK}\underline{r}^1_{ij}$ result from the six relative positions $\underline{r}^1_{TK}$ and orientations $\underline{\underline{T}}$ to be reached with the platform shown in FIG. 5. For vectors $^{TK}\underline{r}^1_{ij}$ not to be linearly dependent, the platform must be moved in all three translational degrees of freedom and oriented with at least three different rotation angles. This, however, results in particularly strict requirements for the measurement method.

2 Measurement

The above-described calibration method for parallel kinematic manipulators assumes that all six deviations $$\underline{\hat{r}}^I_{KF} \text{ and } \underline{\hat{T}}$$

can be measured on the TCP for at least six different TCP positions. FIG. 1 schematically shows a probing unit 4, with the help of which, in conjunction with a suitable test workpiece, all six TCP deviations can be determined by measurements. For this purpose, probing unit 4 is connected to the hexapod platform via a mechanical adapter. Six rectangular measuring mandrels of the test workpiece are then probed with the probing unit from a reference point (zero point). The different positions and orientations of the measuring mandrels must be selected according to the application to obtain a system of equations conditioned in an optimum manner. The test workpiece must be previously measured in a coordinate measuring device to obtain the exact position and orientation of the measuring mandrels. The six TCP deviations with respect to the reference position can then be easily determined with six probing subsystems, which in this case are the measuring probes.

3 Simulation

Figure 6A:
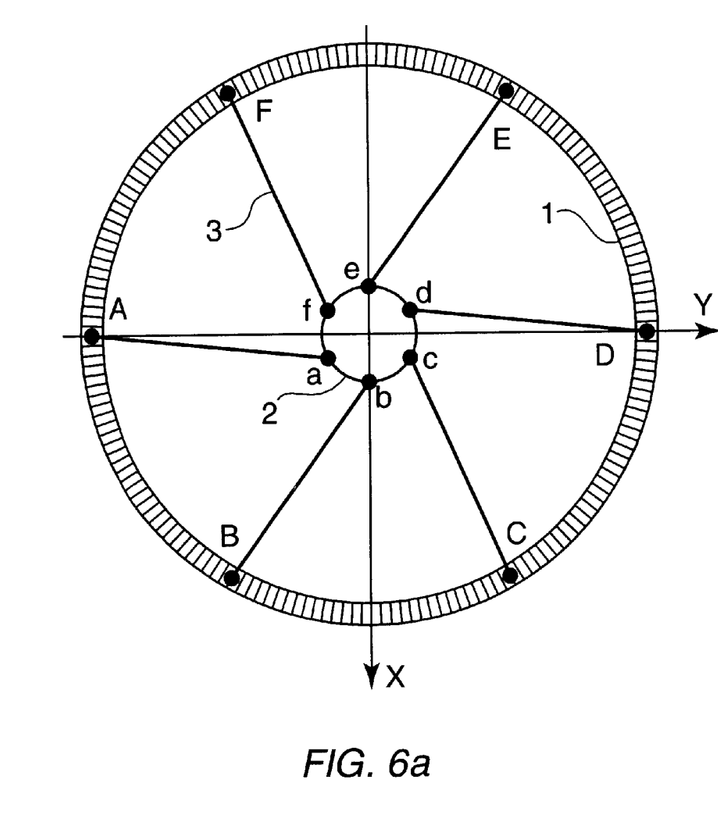
FIGS. 6a and 6b are diagrams showing the side and top geometry of a hexapod used for simulating a suitable calibration algorithm.
Figure 6B:
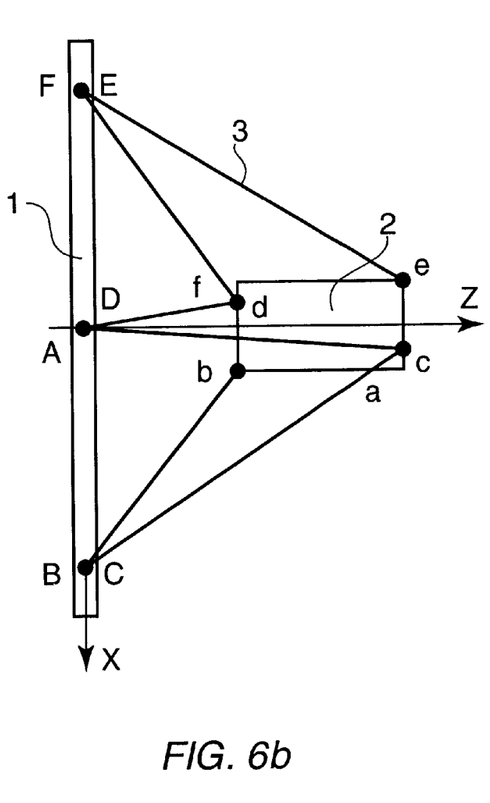

The performance of the above algorithm is demonstrated using a simulation. For this purpose, a parallel kinematic manipulator according to FIG. 6 will be considered. The coordinates of the joint points are given in Table 3.1

TABLE 3.1

Joint coordinates of the hexapod illustrated in FIG. 6

| | Base coordinates in mm | | | | | |
|---|---|---|---|---|---|---|
| | A | B | C | D | E | F |
| X | 0,0 | 606,2 | 606,2 | 0,0 | −606,2 | −606,2 |
| Y | −700,0 | −350,0 | 350,0 | 700,0 | 350,0 | −350,0 |
| Z | 0,0 | 0,0 | 0,0 | 0,0 | 0,0 | 0,0 |

| | Platform coordinates in mm | | | | | |
|---|---|---|---|---|---|---|
| | a | b | c | d | e | f |
| x | 60,0 | 120,0 | 60,0 | −60,0 | −120,0 | −60,0 |
| y | −103,9 | 0,0 | 103,9 | 103,9 | 0,0 | −103,9 |
| z | 200,0 | −200,0 | 200,0 | −200,0 | 200,0 | −200,0 |

Figure 7A:
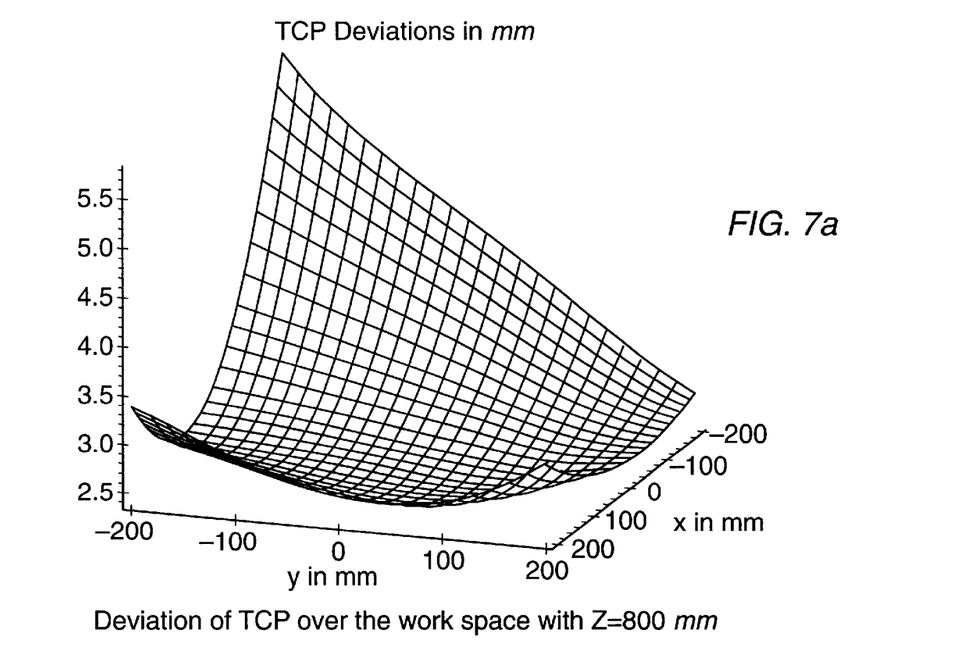
FIGS. 7a & 7b are plots that show deviations of the TCPs over the work space before and after an iteration step of the algorithm, with fixed orientation and z coordinates.

Different coordinates of the joint points are now each shifted by 1.0 mm (Table 3.2). The absolute values of the resulting deviations of the TCP are shown in FIG. 7a over the work space. The spindle axis is oriented along the z axis and has a constant z excursion of z=800 mm.

TABLE 3.2

Deviations of the joint coordinates (FIG. 6)

| | Deviation of the base coordinates in mm | | | | | |
|---|---|---|---|---|---|---|
| | A | B | C | D | E | F |
| X | 0,0 | 1,0 | 0,0 | 0,0 | −1,0 | 0,0 |
| Y | −1,0 | 0,0 | −1,0 | 0,0 | 0,0 | −1,0 |
| Z | 1,0 | 0,0 | 0,0 | 0,0 | 0,0 | 1,0 |

| | Deviation of the platform coordinates in mm | | | | | |
|---|---|---|---|---|---|---|
| | a | b | c | d | e | f |
| x | 0,0 | 1,0 | 0,0 | 0,0 | 0,0 | 1,0 |
| y | 0,0 | 0,0 | 1,0 | 1,0 | 0,0 | 0,0 |
| z | 1,0 | 0,0 | 0,0 | 1,0 | 0,0 | 0,0 |

The coordinate errors of the joint points according to Table 3.2 provide the iteration shown in Table 3.3 for the six platform positions probed. Table 3.3 shows the vectorial absolute values of all TCP deviations for the six work space positions.

TABLE 3.3

Iteration
TCP deviations in the six work space positions in mm

| Iteration | Pos. 1 | Pos. 2 | Pos. 3 | Pos. 4 | Pos. 5 | Pos. 6 |
|---|---|---|---|---|---|---|
| 0 | 3,46051 | 2,78072 | 2,97036 | 2,32578 | 2,55263 | 2,82524 |
| 1 | 0,05054 | 0,03182 | 0,03148 | 0,01237 | 0,01959 | 0,02396 |
| 2 | 0,00006 | 0,00005 | 0,00001 | 0,00004 | 0,00001 | 0,00004 |

Figure 7B:
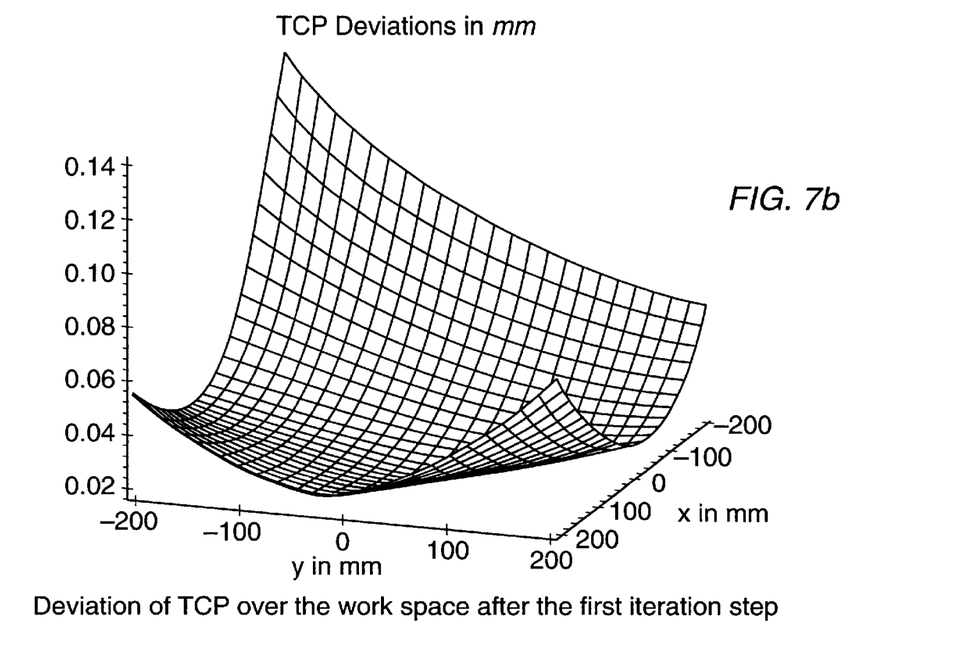

Table 3.3 shows that the deviations at the TCP can be brought to an order of magnitude of about 0.03 mm as early as after the first iteration step, which corresponds to a reduction by a factor of 100 with respect to the initial situation. FIG. 7b shows the deviations of the TCP over the work space after the first iteration step. It can be seen that the deviations are relatively high especially at the edges of the work space, but are considerably reduced with respect to the initial situation. However, the rate of convergence of the method is reduced by the effect of random measuring errors and error sources that have not been taken into account in the model.

What is claimed is:

1. A calibration device for measuring n deviations and determining m unknown spatial coordinates of a parallel kinematic manipulator having a base unit and a manipulator platform movable with respect to the base unit, the base unit being connected to the manipulator platform via a plurality of joints and having a workholding fixture for a tool, wherein the calibration device comprises:
    a test workpiece mountable in a defined spatial relation to the base unit;
    measuring mandrels numbering $1=m/n$, arranged on the test workpiece in a known spatial position and a known spatial orientation with respect to a reference spatial position and a reference spatial orientation;
    a probing unit mountable on the workholding fixture of the manipulator platform;
    n probing subsystems, each of the n probing subsystems including a distance measuring device for relative measurements, and being oriented with respect to each other of the n probing subsystems such that the probing unit is adapted for measuring the known spatial position and known spatial orientation of the measuring mandrels on the test workpiece; and
    a reference measuring mandrel disposed on the test workpiece, defining the reference spatial position and reference spatial orientation, and such that the measuring mandrels are arranged in the known spatial position and orientation with respect to said reference plug;
    wherein six measuring mandrels are arranged on the test workpiece such that a maximum of three of the measuring mandrels have substantially the same spatial orientation and have spatial positions that are linearly independent of one another, and wherein the remaining measuring mandrels each have different spatial orientations with respect to the maximum of three measuring mandrels.

2. A calibration device for measuring n deviations and determining m unknown spatial coordinates of a parallel kinematic manipulator having a base unit and a manipulator platform movable with respect to the base unit, the base unit being connected to the manipulator platform via a plurality of joints and having a workholding fixture for a tool, wherein the calibration device comprises:
    a test workpiece mountable in a defined spatial relation to the base unit;
    measuring mandrels numbering $1=m/n$, arranged on the test workpiece in a known spatial position and a known spatial orientation with respect to a reference spatial position and a reference spatial orientation;
    a probing unit mountable on the workholding fixture of the manipulator platform; and
    n probing subsystems, each of the n probing subsystems including a distance measuring device for relative measurements, and being oriented with respect to each other of the n probing subsystems such that the probing unit is adapted for measuring the known spatial position and known spatial orientation of the measuring mandrels on the test workpiece;
    wherein m=36 and n=6; and
    wherein at least three of the probing subsystems of the probing unit are arranged so that their measuring directions are linearly independent of one another, and remaining probing subsystems are arranged so that their rotational deviations are obtainable from one differential measurement.

3. A calibration device for measuring n deviations and determining m unknown spatial coordinates of a parallel kinematic manipulator having a base unit and a manipulator platform movable with respect to the base unit, the base unit being connected to the manipulator platform via a plurality of joints and a plurality of variable-length actuators, and having a workholding fixture for a tool, wherein the calibration device comprises:
    a test workpiece mountable in a defined spatial relation to the base unit;
    measuring mandrels numbering $1=m/n$, arranged on the test workpiece in a known spatial position and a known spatial orientation with respect to a reference spatial position and a reference spatial orientation;
    a probing unit mountable on the workholding fixture of the manipulator platform;
    n probing subsystems, each of the n probing subsystems including a distance measuring device for relative measurements, and being oriented with respect to each other of the n probing subsystems such that the probing unit is adapted for measuring the known spatial position and known spatial orientation of the measuring mandrels on the test workpiece; and
    a reference measuring mandrel disposed on the test workpiece, defining the reference spatial position and reference spatial orientation, and such that the measuring mandrels are arranged in the known spatial position and orientation with respect to said reference plug;
    wherein the measuring mandrels are arranged on the test workpiece such that a maximum of three of the measuring mandrels have substantially the same spatial orientation and have spatial positions that are linearly independent of one another, and wherein the remaining measuring mandrels each have different spatial orientations with respect to the maximum of three measuring mandrels.

4. The calibration device according to claim 3, wherein the test workpiece has a base portion adapted for receiving the measuring mandrels in the known spatial position and orientation.

5. The calibration device according to claim 4, further comprising a three-point support for mounting the base portion in a defined spatial orientation with respect to the manipulator platform.

6. The calibration device according to claim 3, wherein geometric dimensions of the test workpiece substantially approximate geometric dimensions of a work space volume of the kinematic manipulator.

7. A calibration device for measuring six deviations and determining thirty-six unknown spatial coordinates of a parallel kinematic manipulator having a base unit and a manipulator platform movable with respect to the base unit, the base unit being connected to the manipulator platform via a plurality of joints and a plurality of variable-length actuators, and having a workholding fixture for a tool, wherein the calibration device comprises:

a test workpiece mountable in a defined spatial relation to the base unit;

measuring mandrels numbering six, arranged on the test workpiece in a known spatial position and a known spatial orientation with respect to a reference spatial position and a reference spatial orientation;

a probing unit mountable on the workholding fixture of the manipulator platform; and six probing subsystems, each of the six probing subsystems including a distance measuring device for relative measurements, and being oriented with respect to each other of the six probing subsystems such that the probing unit is adapted for measuring the known spatial position and known spatial orientation of the measuring mandrels on the test workpiece;

wherein at least three of the probing subsystems of the probing unit are arranged so that their measuring directions are linearly independent of one another, and remaining probing subsystems are arranged so that their rotational deviations are obtainable from one differential measurement.

8. The calibration device according to claim 7, wherein the test workpiece has a base portion adapted for receiving the measuring mandrels in the known spatial position and orientation.

9. The calibration device according to claim 8, further comprising a three-point support for mounting the base portion in a defined spatial orientation with respect to the manipulator platform.

10. The calibration device according to claim 7, wherein geometric dimensions of the test workpiece substantially approximate geometric dimensions of a work space volume of the kinematic manipulator.

* * * * *